March 13, 1956     J. C. TRAVILLA ET AL     2,738,035
RAILWAY TRUCK AND BRAKE GEAR Filed April 16, 1952     2 Sheets-Sheet 1

INVENTORS.
James C. Travilla
Joseph J. Harley
By Rodney Bedell
atty.

March 13, 1956  J. C. TRAVILLA ET AL  2,738,035
RAILWAY TRUCK AND BRAKE GEAR

Filed April 16, 1952  2 Sheets-Sheet 2

INVENTORS.
James C. Travilla
Joseph J. Harley
By Rodney Bedell
atty.

United States Patent Office 2,738,035
Patented Mar. 13, 1956

2,738,035

RAILWAY TRUCK AND BRAKE GEAR

James C. Travilla, University City, Mo., and Joseph J. Harley, Granite City, Ill., assignors to General Steel Castings Corporation, Granite City, Ill., a corporation of Delaware Application April 16, 1952, Serial No. 282,640

7 Claims. (Cl. 188—46)

The invention relates to brake gear as applied to railway rolling stock and more particularly to the arrangement and mounting of brake shoes, levers, equalizers and connections on a six-wheel truck in which the brake is applied to one side only of each wheel.

The main object of the invention is to provide a six wheel truck brake arrangement adapted for use where the space for the brake parts between the vehicle body and the truck and between the truck parts themselves is limited. At the same time, another object is to provide a brake having a minimum total number of parts, as well as a minimum number of parts which are subject to wear, and a brake which applies equal pressures on all wheels.

A more specific object is to apply the brakes only to the portion of the treads of the wheels on the end axles nearer the middle axle and thereby secure greater stability against tilting of the truck frame longitudinally of the vehicle when brakes are applied.

These and other more detail objects as will appear from the following description are attained by the structure shown in the accompanying drawings, in which.

Figure 1:
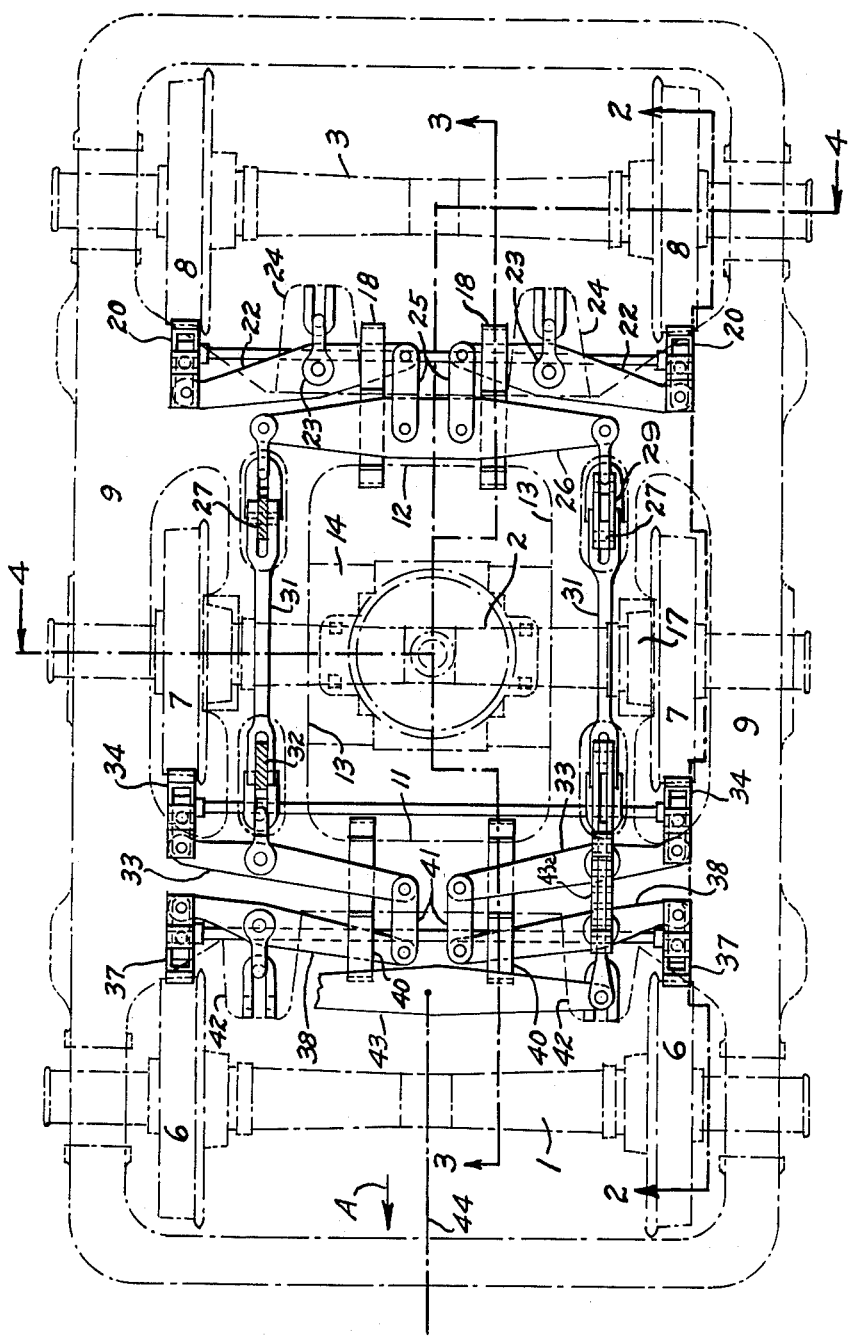
Figure 1 is a top view of a six wheel truck with the truck frame, wheels, and axles shown in dot and dash lines and most of the brake gear shown in solid lines to more clearly illustrate the invention. Parts of the brake gear are sectioned for the same purpose.

The three wheeled axles 1, 2, 3 and their corresponding wheels 6, 7, 8 support and are held in spaced relation by the truck frame which includes wheel pieces 9 with depending pedestals 10 and transverse transoms 11, 12, there being longitudinal members 13 extending between transoms 11, 12 and connected by a short bolster 14 which carries the usual center plate 15 on which the body underframe center sill 16 is mounted. Members 13 also include side bearings 17. Elements 9–17 may comprise parts of a one piece casting or may comprise a number of separate elements rigidly assembled.

Wheel pieces 9 are at about the same level as the tops of the wheels. The end portions of transoms 11, 12 are at the same level but transoms 11, 12 are dropped between their ends to provide a lower mounting of bolster 14, center plate 15 and the adjacent portion of the body center sill, and to accommodate brake gear elements to be described.

Figure 2:
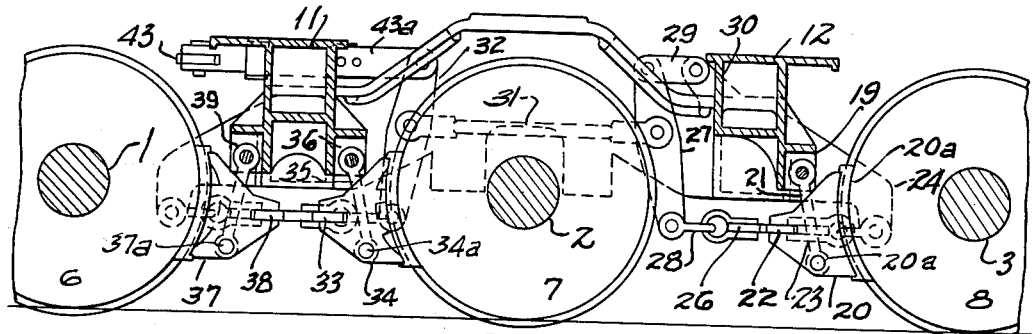
Figures 2 and 3 are longitudinal vertical sections taken on the corresponding section lines of Figure 1, the vehicle body center still being indicated in dot and dash lines in Figure 3.
Figure 3:
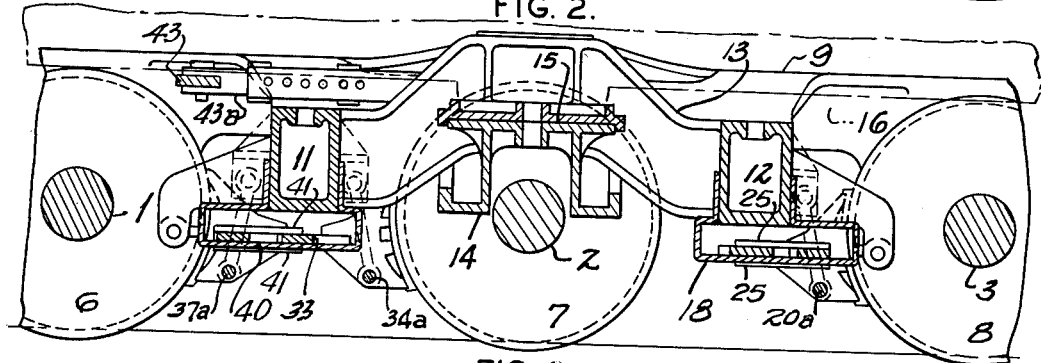
Figure 4:
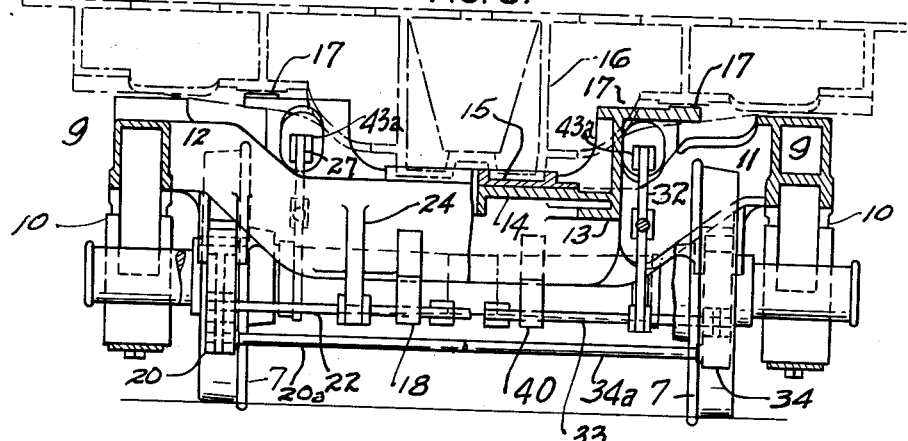
Figure 4 is a transverse vertical section taken on line 4—4 of Figure 1 with the vehicle body underframe being indicated in dot and dash lines, the end wheel and portion of the end axle on the left hand side being omitted and portion of the middle axle on right side also being omitted.

Depending from each transom 11, 12 at opposite sides of the longitudinal center line of the truck is a bracket 18 forming a support below the transoms for brake gear levers. Transom 12 is provided with brackets 19 in line with wheels 8 and brake heads 20 are suspended from brackets 19 by hangers 21, and are provided with the usual shoes 20a for application to the wheels. Horizontal brake levers 22 extend inwardly from brake heads 20 to which they are pivotally connected and terminate near the longitudinal center line of the truck. The inner ends of brake levers 22 are supported upon brackets 18 and a clevis 23 fulcrums the middle portion of each lever to a bracket 24 on the adjacent transom 12. The inner end of each lever 22 is connected by links 25 to the intermediate portion of a single horizontal equalizer lever 26 supported on brackets 18 and extending transversely of the truck to points adjacent to but spaced from brake heads 20. Substantially upright levers 27 (Figures 2, 4) have their lower ends secured to the ends of equalizer 26 by links 28 and have their upper ends anchored by links 29 to brackets 30 on transom 12.

A link 31 extends longitudinally of the truck over middle axle 2 and connects each upright lever 27 with a corresponding upright lever 32, having its lower end connected to and carried by the intermediate portion of a horizontal brake lever 33, corresponding to one of the levers 22 previously described and connected at its outer end to brake head 34 associated with one of the middle wheels 7.

Heads 34 are suspended by links 35 from brackets 36 on transom 11. Corresponding heads 37, levers 38, and hangers 39 are associated with the wheels on the other end axle 1. Levers 33 and 38 are supported at their inner ends on brackets 40, corresponding to brackets 18 and extending from transom 11. The inner end of each lever 33 is connected by links 41 to the inner end of the corresponding lever 38 and each lever 38 is fulcrumed to a bracket 42 on transom 11.

The brake heads 20, 34 and 37 on opposite sides of the truck are held in transverse position by means of the tie bars 20a, 34a, and 37a.

The upper ends of levers 32 are connected by links 43a to the ends of a power-operated main equalizing lever 43 connected by a pull rod 44 to the body-mounted foundation brake gear parts (not shown) disclosed and claimed in a co-pending application, Serial No. 282,623, filed April 16, 1952, in the name of Thomas J. Kolesa.

When rod 44 is moved to the left, as indicated by the arrow A, Figure 1, the brakes are applied to the wheels, the levers shifting about their respective fulcrums and the braking forces being utilized as is well understood in the art.

The above described brake gearing utilizes relatively few parts as compared with brake gears for six-wheel trucks previously used and most of the parts are relatively short and are easily assembled and are closely coupled to associated parts. The braking forces are transferred from a relatively high level pull rod and equalizer, forming parts of the body brake rigging, to the relatively low level horizontal brake levers and brake heads without interference with body or truck framing elements or other equipment.

The details of the structure may be varied substantially without departing from the spirit of the invention and the exclusive use of those modifications coming within the scope of the accompanying claims is contemplated.

What is claimed is:

1. In a railway truck with three wheeled axles and a truck frame supported therefrom and having wheel pieces and transverse transoms positioned respectively between the middle axle and each end axle, a brake head associated with each wheel on one end axle, individual brake head horizontal levers, each connected at its outer end to one of the brake heads and fulcrumed intermediate its ends to the nearest transom, a horizontal equalizing lever extending transversely of the truck, a link connection between the inner end of each brake head lever and said horizontal equalizing lever, individual upright levers connected at their lower ends to the ends of said horizontal equalizing lever and extending upwardly therefrom and having a fulcrum connection to said transom, brake gear including brake heads associated with the wheels on the other two axles, linkage connecting said upright levers to said latter-mentioned brake gear, and means for connecting said latter-mentioned brake gear to a power source.

2. In a railway truck with three wheeled axles and a truck frame supported therefrom and having wheel pieces and transverse transoms positioned respectively between the middle axle and an individual end axle, a brake head associated with each wheel on one end axle, individual brake head horizontal levers, each connected at its outer end to one of the brake heads and positioned at substantially the same lever as said brake heads and fulcrumed intermediate its ends to the nearest transom, a horizontal equalizing lever extending transversely of the truck at substantially the same level as said horizontal levers, a link connection between the inner end of each of said brake head levers and said horizontal equalizing lever, individual upright levers connected at their lower ends to the ends of said horizontal equalizing lever and extending upwardly from said horizontal equalizing lever and fulcrumed at their upper ends to said transom, a main equalizing lever at the opposite side of the middle axle, and linkage connecting the intermediate portions of said upright levers to said main equalizing lever.

3. A truck and brake gear structure as described in claim 1 in which the horizontal equalizing lever is positioned beneath the transom to which the horizontal brake head levers are fulcrumed.

4. In a railway truck with three wheeled axles and a truck frame supported therefrom and having wheel pieces and transverse transoms positioned respectively between the middle axle and an individual end axle, a brake head associated with each wheel on one end axle, said brake heads being at one side of the adjacent transom, individual brake head horizontal levers, each connected at its outer end to one of said brake heads and fulcrumed intermediate its ends to said transom, a horizontal equalizing lever extending transversely of the truck beneath said transom, a link connection between the inner end of each brake head lever and said equalizing lever, individual upright levers at the opposite side of said transom and connected at their lower ends to the ends of said equalizing lever and extending upwardly therefrom and fulcrumed at their upper ends to said transom, a main equalizing lever at the opposite side of the middle axle, and linkage connecting the intermediate portions of said upright levers to said main equalizing lever.

5. In a railway truck with three wheeled axles, a truck frame supported thereon, an individual brake head associated with each wheel, a brake head horizontally disposed lever associated with each brake head, two of said heads and levers associated with one end axle being between the middle axle and that end axle, with the levers fulcrumed to the truck frame, a horizontal equalizing lever connected to both of said two levers, upright levers connected at their lower ends to the ends of the equalizer leber, brake gear including brake heads, horizontal levers and upright levers therefor associated with the middle axle and the other end axle and being positioned between the latter-mentioned axles, a main equalizing lever connected to the latter-mentioned upright levers, and linkage connecting the upright levers at the opposite sides of the middle axle intermediate the ends of the upright levers.

6. In a brake gear assembly for a railway vehicle truck having three wheeled axles and a truck frame with an individual brake head suspended therefrom for each wheel, a brake head substantially horizontal lever extending inwardly of the truck from each brake head, the levers for the end wheel heads being fulcrumed between their ends to the truck frame, the heads and levers for one end axle and the middle axle being positioned between the corresponding axles, and the heads and levers for the other end axle being positioned between that axle and the middle axle links directly connecting the inner ends of the levers for the middle wheel heads and the inner ends of the levers for the wheel heads for the adjacent end axle, a lever connected to the intermediate portion of each middle wheel head lever and extending upwardly therefrom, a horizontal equalizer connected to the inner ends of the levers for the wheel heads on the second-mentioned end axle, a lever connected to each end of said equalizer and extending upwardly therefrom, a linkage between the intermediate portions of the upwardly extending levers at the same side of the truck, anchors on the truck frame for the upper ends of both upwardly extending levers at one side of the middle axle, an equalizer connected at its ends to the upper ends of the upwardly extending levers at the other side of the middle axle, and a pull rod for connecting the latter-mentioned equalizer to a brake operating mechanism.

7. In a railway truck with three wheeled axles and a truck frame supported thereon, an individual brake head applicable to each wheel, a brake head horizontally disposed individual lever associated with each brake head and extending therefrom inwardly towards the longitudinal center line of the truck, two of said levers for the heads applicable to the wheels on one end axle being positioned between that end axle and the middle axle and fulcrumed to the truck frame, a horizontal equalizing lever connected near its middle to both of said two levers near the inner ends of the latter, upright levers connected at their lower ends to the outer ends of the equalizing lever, the upper ends of said upright levers being anchored to the truck frame, the heads and horizontal levers associated with the wheels on the middle axle being positioned between the latter and the other end axle, upright levers operatively connected at their lower ends to the inner ends of said latter-mentioned horizontal levers, linkage connecting the intermediate portions of the upright levers at opposite sides of the middle axle, and a power-actuated pull rod operatively connected to the upper ends of the second-mentioned upright levers.

References Cited in the file of this patent

UNITED STATES PATENTS

| | | |
|---|---|---|
| 1,298,228 | Larsen | Mar. 25, 1919 |
| 1,319,877 | Larsen | Oct. 28, 1919 |
| 2,148,366 | Baselt et al. | Feb. 21, 1939 |
| 2,213,371 | Stertzbach et al. | Sept. 3, 1940 |